United States Patent
Warren et al.

(10) Patent No.: US 10,197,979 B2
(45) Date of Patent: Feb. 5, 2019

(54) DETERMINING OCCUPANCY WITH USER PROVIDED INFORMATION

(71) Applicant: Vivint, Inc., Provo, UT (US)

(72) Inventors: Jeremy B. Warren, Draper, UT (US); Brandon Bunker, Highland, UT (US); Jefferson Lyman, Alpine, UT (US); Jungtaik Hwang, Draper, UT (US)

(73) Assignee: Vivint, Inc., Provo, UT (US)

( * ) Notice: Subject to any disclaimer, the term of this patent is extended or adjusted under 35 U.S.C. 154(b) by 613 days.

(21) Appl. No.: 14/291,789

(22) Filed: May 30, 2014

(65) Prior Publication Data

US 2015/0347916 A1 Dec. 3, 2015

(51) Int. Cl.
| | | |
|---|---|---|
| G06F 17/00 | (2006.01) | |
| G06N 5/02 | (2006.01) | |
| G05B 15/02 | (2006.01) | |
| G06N 5/04 | (2006.01) | |

(52) U.S. Cl.
CPC ............... *G05B 15/02* (2013.01); *G06N 5/04* (2013.01); *G05B 2219/2642* (2013.01)

(58) Field of Classification Search
None
See application file for complete search history.

(56) References Cited

U.S. PATENT DOCUMENTS

| | | | |
|---|---|---|---|
| 4,174,064 A | 11/1979 | Pratt | |
| 5,344,068 A | 9/1994 | Haessig et al. | |
| 5,668,446 A | 9/1997 | Baker et al. | |
| 5,699,243 A | 12/1997 | Eckel et al. | |
| 5,909,378 A | 6/1999 | De Milleville et al. | |
| 5,924,486 A | 7/1999 | Ehlers et al. | |
| 5,962,989 A | 10/1999 | Baker et al. | |
| 5,973,594 A | 10/1999 | Baldwin et al. | |
| 6,108,614 A | 8/2000 | Lincoln et al. | |
| 6,216,956 B1 | 4/2001 | Ehlers et al. | |
| 6,263,260 B1 | 7/2001 | Bodmer et al. | |
| 6,377,858 B1 | 4/2002 | Koeppe | |
| 7,469,550 B2 | 12/2008 | Chapman, Jr. et al. | |
| 7,761,186 B2 | 7/2010 | Fadell et al. | |

(Continued)

FOREIGN PATENT DOCUMENTS

| | | |
|---|---|---|
| GB | 2448896 A | 11/2008 |
| KR | 1020130107838 | 10/2013 |

(Continued)

OTHER PUBLICATIONS

International Search Report and Written Opinion of the International Searching Authority for PCT/US2015/026932, dated Jul. 15, 2015.

(Continued)

*Primary Examiner* — Kakali Chaki
*Assistant Examiner* — Daniel T Pellett
(74) *Attorney, Agent, or Firm* — Holland & Hart, LLP

(57) ABSTRACT

Methods and systems are described for determining occupancy with user provided information. According to at least one embodiment, a method for determining occupancy with user provided information includes using at least one sensor to detect occupancy in a building over time, determining a predictive schedule based on the occupancy detected with the at least one sensor, and requesting information relevant to the predictive schedule from a user.

17 Claims, 11 Drawing Sheets

(56) References Cited

U.S. PATENT DOCUMENTS

| | | | |
|---|---|---|---|
| 7,765,033 B2 | 7/2010 | Perry | |
| 7,918,406 B2 | 4/2011 | Rosen | |
| 8,066,558 B2 | 11/2011 | Thomle et al. | |
| 8,086,352 B1 | 12/2011 | Elliott | |
| 8,111,131 B2 | 2/2012 | Zaveruha et al. | |
| 8,180,492 B2 | 5/2012 | Steinberg | |
| 8,195,313 B1 | 6/2012 | Fadell et al. | |
| 8,214,061 B2 | 7/2012 | Westrick, Jr. et al. | |
| 8,219,251 B2* | 7/2012 | Amundson | G05B 19/0426 |
| | | | 700/276 |
| 8,237,540 B2 | 8/2012 | Zaveruha et al. | |
| 8,280,536 B1 | 10/2012 | Fadell et al. | |
| 8,335,842 B2 | 12/2012 | Raji et al. | |
| 8,350,697 B2 | 1/2013 | Trundle et al. | |
| 8,386,082 B2 | 2/2013 | Oswald | |
| 8,410,896 B2 | 4/2013 | Zaveruha et al. | |
| 8,412,654 B2 | 4/2013 | Montalvo | |
| 8,457,793 B2 | 6/2013 | Golding et al. | |
| 8,457,796 B2 | 6/2013 | Thind | |
| 8,458,102 B2 | 6/2013 | Bill | |
| 8,478,447 B2 | 7/2013 | Fadell et al. | |
| 8,489,243 B2 | 7/2013 | Fadell et al. | |
| 8,510,255 B2* | 8/2013 | Fadell | G05B 15/02 |
| | | | 706/52 |
| 8,511,576 B2 | 8/2013 | Warren et al. | |
| 8,511,577 B2 | 8/2013 | Warren et al. | |
| 8,523,083 B2 | 9/2013 | Warren et al. | |
| 8,532,827 B2 | 9/2013 | Stefanski et al. | |
| 8,538,596 B2 | 9/2013 | Gu et al. | |
| 8,543,244 B2 | 9/2013 | Keeling et al. | |
| 8,544,285 B2 | 10/2013 | Stefanski et al. | |
| 8,554,376 B1 | 10/2013 | Matsuoka et al. | |
| 8,556,188 B2 | 10/2013 | Steinberg | |
| 8,558,179 B2 | 10/2013 | Filson et al. | |
| 8,560,128 B2 | 10/2013 | Ruff et al. | |
| 8,600,562 B2 | 12/2013 | Oswald | |
| 8,620,841 B1* | 12/2013 | Filson | H04L 12/1895 |
| | | | 706/12 |
| 8,622,314 B2 | 1/2014 | Fisher et al. | |
| 8,627,127 B2 | 1/2014 | Mucignat et al. | |
| 8,630,740 B2 | 1/2014 | Matsuoka et al. | |
| 8,630,741 B1 | 1/2014 | Matsuoka et al. | |
| 8,850,348 B2* | 9/2014 | Fadell | G05D 23/1902 |
| | | | 236/46 R |
| 9,245,229 B2 | 1/2016 | Fadell et al. | |
| 2002/0134849 A1 | 9/2002 | Disser | |
| 2007/0032225 A1 | 2/2007 | Konicek et al. | |
| 2008/0079569 A1 | 4/2008 | Axelsen | |
| 2010/0025483 A1 | 2/2010 | Hoeynck et al. | |
| 2011/0181412 A1 | 7/2011 | Alexander et al. | |
| 2011/0253796 A1 | 10/2011 | Posa et al. | |
| 2012/0025717 A1 | 2/2012 | Klusmann et al. | |
| 2012/0066168 A1 | 3/2012 | Fadell et al. | |
| 2012/0072030 A1 | 3/2012 | Elliot | |
| 2012/0085831 A1 | 4/2012 | Kopp | |
| 2012/0086568 A1 | 4/2012 | Scott et al. | |
| 2012/0143356 A1 | 6/2012 | Berg-Sonne et al. | |
| 2012/0143357 A1 | 6/2012 | Chemel et al. | |
| 2012/0143810 A1 | 6/2012 | Berg-Sonne | |
| 2012/0150788 A1 | 6/2012 | Berg-Sonne et al. | |
| 2012/0165993 A1* | 6/2012 | Whitehouse | G05D 23/1904 |
| | | | 700/278 |
| 2012/0186774 A1 | 7/2012 | Matsuoka et al. | |
| 2012/0259469 A1 | 10/2012 | Ward et al. | |
| 2012/0261481 A1 | 10/2012 | Donlan | |
| 2012/0265501 A1 | 10/2012 | Goldstein et al. | |
| 2012/0271460 A1 | 10/2012 | Rognli | |
| 2012/0299728 A1 | 11/2012 | Kirkpatrick et al. | |
| 2012/0310376 A1* | 12/2012 | Krumm | G05B 15/02 |
| | | | 700/31 |
| 2013/0030600 A1 | 1/2013 | Shetty | |
| 2013/0060360 A1 | 3/2013 | Yamamoto | |
| 2013/0151012 A1 | 6/2013 | Shetty et al. | |
| 2013/0173064 A1* | 7/2013 | Fadell | G05D 23/1902 |
| | | | 700/276 |
| 2013/0245837 A1 | 9/2013 | Grohman | |
| 2013/0268124 A1 | 10/2013 | Matsuoka et al. | |
| 2013/0268125 A1 | 10/2013 | Matsuoka | |
| 2013/0292481 A1 | 11/2013 | Filson et al. | |
| 2013/0297555 A1* | 11/2013 | Fadell | G05B 15/02 |
| | | | 706/52 |
| 2013/0325189 A1 | 12/2013 | Miura | |
| 2014/0005837 A1 | 1/2014 | Fadell et al. | |
| 2014/0012821 A1 | 1/2014 | Fuhrmann et al. | |
| 2014/0052300 A1 | 2/2014 | Matsuoka et al. | |
| 2014/0098596 A1 | 4/2014 | Poulton et al. | |
| 2014/0107846 A1 | 4/2014 | Li | |
| 2014/0239817 A1 | 8/2014 | Leinen et al. | |
| 2015/0070181 A1 | 3/2015 | Fadell et al. | |
| 2015/0264777 A1 | 9/2015 | Leinen | |
| 2015/0285527 A1 | 10/2015 | Kim et al. | |
| 2015/0297778 A1 | 10/2015 | Conroy et al. | |
| 2015/0308706 A1 | 10/2015 | Bunker et al. | |
| 2015/0309484 A1 | 10/2015 | Lyman | |
| 2015/0323915 A1 | 11/2015 | Warren et al. | |
| 2015/0347916 A1 | 12/2015 | Warren et al. | |
| 2016/0004237 A1 | 1/2016 | Mohan et al. | |
| 2017/0153613 A1 | 6/2017 | Agarwal | |

FOREIGN PATENT DOCUMENTS

| | | |
|---|---|---|
| KR | 1020140047851 | 4/2014 |
| WO | 2009036764 A2 | 3/2009 |
| WO | 2012142477 A3 | 1/2010 |
| WO | 2014033189 | 3/2014 |

OTHER PUBLICATIONS

English Machine Translation for KR1020140047851, Apr. 23, 2014.
English Machine Translation for KR1020130107838, Oct. 2, 2013.
Allure Energy, Eversense, www.allure-energy.com/mainpage.html, accessed on Apr. 2, 2014, 7 pages.
Ecobee Inc., Ecobee, http://www.ecobee.com/, accessed on Apr. 2, 2014, 5 pages.
Erickson et al., Occupancy Based Demand Response HVAC Control Strategy, University of California Merced, 2010, 6 pages.
Erickson et al., Observe: Occupancy-Based System for Efficient Reduction of HVAC Energy, University of California Merced, Electrical Engineering and Computer Science, 2011, 12 pages.
Gao et al., Spot: A Smart Personlaized Office Thermal Control System, School of Computer Science, University of Waterloow, Waterloo, Ontario, May 24, 2013, 10 pages.
Gupta et al., Adding GPS-Control to Traditional Thermostats:An Exploration of Potential Energy Savings and Design Challenges, Massachusetts Institute of Technology, Cambridge, 2009, 18 pages.
Kleiminger et al., Predicting household occupancy for smart heating control: A comparative performance analysis of state-of-the-art approaches, Institute for Pervasive Computing, ETCH Zurich and Wireless Sensor Networks Lab, TU Darmstadt, 2013, pp. 1-26.
Koehler et al., UbiComp '13 Proceedings of the 2013 ACM international joint conference on Pervasive and ubiquitous computing, New York, 2013, Abstract only, 1 page.
Lee et al., Occupancy Prediction Algorithms for Thermostat Control Systems Using Mobile Devices, IEEE Transactions on Smart Grid 4.3: 1332-40, IEEE, Sep. 2013. Abstract only, 3 pages.
Lu et al., The Smart Thermostat: Using Occupancy Sensors to Save Energy in Homes, Department of Computer Science, University of Virginia and School of Architecture, University of Virginia, Nov. 5, 2011, 14 pages.
Mamidi et al., Smart Sensing, Estimation, and Prediction for Efficient Building Energy Management, Information Sciences Institute, University of Southern California, 2011, 10 pages.
Mamidi et al., Improving Building Energy Efficiency with a Network of Sensing, Learning and Prediction Agents, Information Sciences Institute, University of Southern California, 2012, 8 pages.
Nest Labs, Inc., Nest Thermostat, https://nest.com/thermostat/life-with-nest-thermostat/, accessed on Apr. 2, 2014, 15 pages.

(56) References Cited

OTHER PUBLICATIONS

Scott et al., Home Heating Using GPS-Based Arrival Prediction, Microsoft Research, Feb. 24, 2010, 6 pages.
Scott et al., PreHeat: Controlling Home Heating Using Occupancy Prediction, Proceeding, UbiComp '11 Proceedings of the 13th international conference on Ubiquitous computing, Sep. 21, 2011, 10 pages.
Gupta et al., Adding GPS-Control to Traditional Thermostats: An Exploration of Potential Energy Savings and Design Challenges, Massachusetts Institute of Technology, 2009, Abstract only, 6 pages.
Tado Inc., Tado, The Heating App, http://www.tado.com/de-en/, accessed on Feb. 14, 2014, 8 pages.
Vazquez et al., Impact of user habits in smart home control, IEEE 16th Conference on Emerging Technologies & Factory Automation (ETFA), Sep. 2011, Abstract only, 2 pages.
Wooley et al., Occupancy Sensing Adaptive Thermostat Controls: A Market Review and Observations from Multiple Field Installations in University Residence Halls, 2012 ACEEE Summer Study on Energy Efficiency in Buildings, 2012, pp. 298-311.
Yang et al., Development of multi-agent system for building energy and comfort management based on occupant behaviors, Energy and Buildings 56: 1-7. Elsevier Sequoia S.A., Jan. 2013, Abstract only, 3 pages.
International Search Report and Written Opinion of the International Searching Authority for PCT/US2015/029670, dated Sep. 3, 2015.
Supplementary European Search Report for EP Application No. 15786321, dated Nov. 10, 2017 (3 pp.).

\* cited by examiner

DETERMINING OCCUPANCY WITH USER PROVIDED INFORMATION

BACKGROUND

Keeping a furnace of a building operating at a level high enough to make residents comfortable when there are no occupants in the home can be costly and wasteful. Likewise, keeping lights on when they are not in use also wastes resources and is an additional cost to homeowners and/or building management. Thus, residents in a home often turn down the lights and/or lower the temperature in their homes when they leave for an extended amount of time to save costs. For example, if a homeowner takes a week-long vacation, the homeowner often manually adjusts the thermostat to keep the home at a temperature that will prevent the house from freezing or overheating while the homeowner is away. But, such a temperature may not necessarily be a temperature that is comfortable for the homeowner. Thus, when the homeowner returns, the homeowner readjusts the thermostat to return the house to a comfortable temperature.

SUMMARY

Methods and systems are described for controlling parameters in a building. According to at least one embodiment, a method for determining occupancy with user provided information includes using at least one sensor to detect occupancy in a building over time, determining a predictive schedule based on the occupancy detected with the at least one sensor, and requesting information relevant to the predictive schedule from a user.

The method may include making a hypothesis about a detail relevant to the predictive schedule. Any appropriate level of analysis of information already obtained from the sensors may be used to make the hypothesis. In other example, the method includes identifying missing information that affects the predictive schedule.

In some embodiments, requesting the information may include sending a question to a device associated with the user, asking a question of the user about missing data relevant to the predictive schedule, asking a question of the user about ascertained data relevant to the predictive schedule associated with an unreliable confidence score, requesting data about a period of time where no occupancy is detected, requesting the information about the number of occupants with location tracking mobile devices, requesting the information to determine whether the at least one sensor has a blind spot, requesting the user to confirm an accuracy of the hypothesis, requesting other types of information, or combinations thereof.

In some examples, information is received from the user. The predictive schedule may be changed based on the information from the user. In other examples, a confidence score is changed about ascertained data relevant to the predictive schedule based on the information from the user. Further, the method may include making a recommendation to the user based on the information received from the user. For example, the method may make a recommendation to install another sensor in response to information that identifies a blind spot.

In another aspect of the principles described herein, a computing device is configured for determining occupancy with user provided information. The computing device includes a processor, memory in electronic communication with the processor, and instructions stored in the memory. The instructions are executable by the processor to use at least one sensor to detect occupancy in a building over time, determine a predictive schedule based on the occupancy detected with the at least one sensor, and request information relevant to the predictive schedule from a user.

In yet another aspect of the principles described herein, a computer program product is used for determining occupancy with user provided information. The computer-program product includes a non-transitory computer-readable medium having instructions thereon. The instructions are executable by a processor to use at least one sensor to detect occupancy in a building over time, determine a predictive schedule based on the occupancy detected with the at least one sensor, make a hypothesis about a detail affecting the predictive schedule, request information from a user to confirm the hypothesis, or combinations thereof.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

Figure 1:
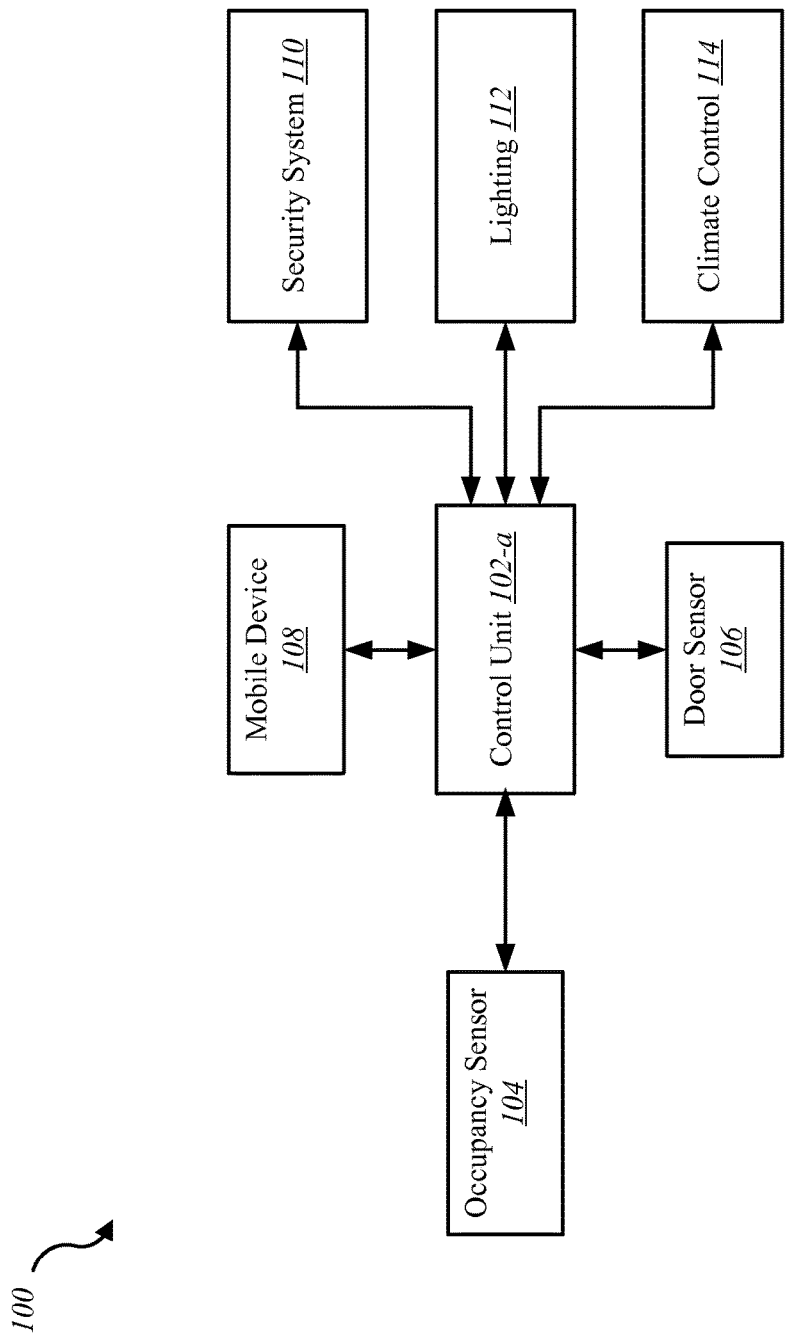
FIG. 1 is a block diagram of an example of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The systems and methods described herein relate to home automation, home security and related security systems and automation for use in commercial and business settings. More specifically, the systems and methods described herein relate to an improved arrangement for determining occupancy in a building with user provided information. The principles described herein use occupancy sensors to predict a schedule of when the building is occupied. The parameters in the building are adjusted based in part on the schedule. In some cases, the information provided by the occupancy sensors can be supplemented with information from the user. The user provided information can be received through requests sent from a control panel asking the user specific questions that pertain to a hypothesis made by the system, missing information relevant to the predictive schedule, information that the system is unsure how to interpret, other types of information, or combinations thereof. Based on the information provided by the occupancy sensors, the system can generate specific questions to assist the system in making the predictive schedule.

As used herein, the term "module" includes a combination of hardware and programmed instructions that are necessary for performing the designated function of the module. Components of the modules may be located on the same physical device or some of the components may be located at remote locations that are in communication with the other components of the module.

FIG. 1 is a block diagram depicting one embodiment of an environment 100 in which the present systems and methods may be implemented. In some embodiments, the environment 100 includes a control unit 102-*a* that is in communication with at least one occupancy sensor 104, a door sensor 106, and a mobile device 108. The control unit 102-*a* is also in communication with a security system 110, lighting 112, and a climate control 114.

Any appropriate mechanism for communicating between the control unit 102-*a*, the occupancy sensors 104, the door sensor 106, and the mobile device 108 may be used. In some examples, a wireless network is utilized to communicate between the control unit 102-*a*, the occupancy sensors 104, the door sensor 106, and the mobile device 108. Examples of networks that may be used include, but are not limited to, local area networks (LAN), wide area networks (WAN), virtual private networks (VPN), wireless networks (using 802.11, for example), and/or cellular networks (using 3G and/or LTE, for example), Bluetooth networks, z-wave networks, ZigBee networks, other types of networks, or combinations thereof.

The control unit 102-*a* may control at least a part of the security and/or automation system. For example, other sensors and/or actuators may send information to the control unit 102-*a* where the signals are processed. Such sensors may include, for example, a camera sensor, audio sensor, forced entry sensor, shock sensor, proximity sensor, boundary sensor, appliance sensor, light fixture sensor, temperature sensor, light beam sensor, three-dimensional (3-D) sensor, motion sensor, smoke sensor, glass break sensor, door sensor, window sensor, carbon monoxide sensor, accelerometer, global positioning system (GPS) sensor, Wi-Fi positioning system sensor, capacitance sensor, radio frequency sensor, near-field sensor, heartbeat sensor, breathing sensor, oxygen sensor, carbon dioxide sensor, brain wave sensor, movement sensor, voice sensor, other types of sensors, or combinations thereof. Such actuators may include, but are not limited to, automated door locks, climate control adjustors, lighting adjusters, sensors activation mechanisms, other types of actuators, or combinations thereof.

The control unit 102-*a* may make decisions based on the communications from the occupancy sensor 104 and the door sensor 106. For example, based on the information sent from the occupancy sensor 104 and the door sensor 106 to the control unit 102-*a*, the control unit 102-*a* may make a decision to activate an alarm, adjust a climate control setting, open or close a window, lock or unlock a door, control a security parameter, manage energy consumption, check the status of a door, locate a person or item, control lighting, control cameras, receive notifications regarding a current status or anomaly associated with a building, perform another task, or combinations thereof. In some cases, a decision may be decided at one of the local sensors, and the local sensors may or may not notify the control unit 102-*a* of the decision and/or resulting action.

In some examples, the control unit 102-*a* includes a user interface where the occupant can interact with the control unit 102-*a*. For example, the occupant can manually give instructions to the control unit 102-*a* to adjust a building parameter, install an occupancy sensor 104, or perform another system task.

In addition to the capabilities mentioned above, the control unit 102-*a* may determine whether the building is occupied or unoccupied. In some examples, the occupancy sensor 104 communicates with the control unit 102-*a* to determine the occupancy state of the building. Any appropriate type or types of occupancy sensors may be used in accordance with the principles described in the present disclosure. A non-exhaustive list of occupancy sensor types may include microphones, motion detectors, video cameras, mobile devices, location devices, infrared devices, temperature devices, touch input devices, other types of devices, or combinations thereof. In some examples, a single occupancy sensor 104 is used to determine whether the entire building is occupied. However, in other examples, multiple occupancy sensors 104 are distributed throughout the building to determine whether the building is occupied. In some cases, multiple different types of occupancy sensors 104 are used to increase the accuracy of occupancy detection.

In an example where a motion detector is used as an occupancy sensor 104, the control unit 102-*a* may determine that the building is not occupied when the motion detector does not detect the presence of an occupant within the building. On the other hand, the control unit 102-*a* may determine that there is an occupant within the building when the motion detector is triggered.

In addition to the occupancy sensor 104, the door sensor 106 or a window sensor may indicate to the control unit 102-a when an event occurs that may indicate a change in occupancy. For example, a probability exists that the building's occupancy state will change when a door to the exterior of the building is open allowing occupants to enter and/or leave the building. In response to the occurrence of such a door type event, the control unit 102-a is aware that the occupancy of the building may have changed. In response to such a door type event, the control unit 102-a may associate a time stamp with the opening and/or closing of the door. The control unit 102-a may make an assumption that occupancy will be consistent until the occurrence of another door type event. As time progresses from the occurrence of the event, a motion detector (or another type of occupancy sensor) may detect the presence of an occupant. As a result, the control unit 102-a may determine that the building will be occupied until the occurrence of another door type event. Likewise, if the motion detector (or another type of occupancy sensor) does not detect an occupant, the control unit 102-a may determine that no occupants are within the building and determine that the building will be unoccupied until a subsequent door type event.

The subsequent door type event may be of the same type of event as the initial door type event. For example, the initial door type event and the subsequent door type event may both be opening the front door to a home. In other examples, the initial door type event is opening a front door, and the subsequent door type event is the opening of a back door. In yet other examples, the initial door type event may be opening a door, and the subsequent door type event may be the opening of a window, the opening of a garage door, another type of event that may indicate a potential change in occupancy, or combinations thereof. While these examples have been described with reference to specific types of events, any appropriate type of event may be used for either of the initial door type event and the subsequent door type event that can indicate a potential change in occupancy.

In some examples, the control unit 102-a determines that there is occupancy or no occupancy after a predetermined time threshold lapses from the occurrence of the door type event. In other examples, the control unit 102-a calculates an increased confidence that there is no occupancy within the building as more time passes from the occurrence of the door type event.

The control unit 102-a or another type of processing device may generate a schedule based on the data collected from the occupancy sensor 104. For example, the occupancy sensors 104 in a household of a single individual who leaves his or her home around 7:45 a.m. and returns home around 5:15 p.m. may have fairly consistent occupancy patterns Monday through Friday. In such an example, the occupancy sensors may fail to detect the presence of the individual during the time period that starts around 7:45 a.m. and ends around 5:15 p.m. Based on such consistent measurements over time, the control unit 102-a may predict that the household will be unoccupied during this time period. As a result, when a door type event occurs around 7:45 a.m. on a week day, the control unit 102-a may determine that the home will be unoccupied until about 5:15 p.m.

Such a generated schedule may vary from day to day. For example, the control unit 102-a may have the capability to determine patterns for each day of the week to account for different schedules on different days of the week. Similarly, the control unit 102-a may have a capability to recognize weekly patterns, monthly patterns, annual patterns, patterns exhibited over less than a week, patterns exhibited over less than a day, other patterns, or combinations thereof.

The occupancy sensors may be positioned throughout an entire building. In other examples, the occupancy sensors are positioned just within areas that are highly indicative of occupancy throughout the entire building.

The predictive schedule may be used, at least in part, to make adjustments to parameters of the building. For example, if the control unit 102-a receives notice that a door type event has occurred, the control unit 102-a can consult the predictive schedule. If the door type event coincides with a predicted transition into an unoccupied state, the control unit 102-a may determine that the building is not occupied. In some examples, the control unit 102-a may continue to monitor the building with occupancy sensors 104 for a predetermined grace period before making the determination that the building is unoccupied.

If the predictive schedule also predicts that the building will be unoccupied for a sufficient period of time, the control unit 102-a may send commands to various control devices throughout the building to adjust parameters to conserve building resources while the building is unoccupied. For example, the control unit 102-a may communicate with lighting 112 and a climate control 114 to reduce energy consumption. Similarly, the control unit 102-a may automatically arm the security system 110 in response to determining that the building is unoccupied. In some examples, appliances like a washing machine may be turned on based on the determination that the building is in an unoccupied state, while other devices, like a television or a radio, may be turned off. While just a few specific parameters are described as being adjusted based on the determination of the building being in an unoccupied state, any appropriate parameter adjustment may be made including adjustments to security parameters, climate parameters, lighting parameters, cleaning parameters, energy consumption parameters, computer parameters, television parameters, door parameters, window parameters, blind parameters, fan parameters, appliance parameters, water parameters, network parameters, other types of parameters, or combinations thereof.

In some situations, the control unit 102-a makes the predictive schedule based on just the information from the occupancy sensor 104. In such a scenario, information from the occupancy sensor 104 may reveal very clear occupancy patterns with easily identified transitions from one state of occupancy to the next. However, in other situations, the occupancy sensor 104 may not have all of the information that the control unit 102-a desires to make a predictive schedule with a high degree of confidence. Further, some of the information from the occupancy sensor 104 may appear to be contradictory. As a result, the control unit 102-a may seek user input about those details relevant to the predictive schedule that are missing, vague, inconsistent, or that otherwise appear to be unreliable.

The control unit 102-a may request the clarifying information from the user. For example, the control unit 102-a may generate a question that is sent to a mobile device associated with at least one occupant of the building. Such a question may be narrowly tailored to provide the control unit 102-a with the information that the control unit 102-a desires to create and/or modify the predictive schedule. For example, if the control unit 102-a cannot determine an occupancy pattern for a specific time period on a particular day of the week, the control unit 102-a may send a question asking the user if he or she is home during that time period on that particular day of week. If the user responses by indicating that the occupant is not home during that time period, the control unit 102-*a* may construct a predictive schedule accordingly with confidence that the home will be unoccupied.

In another scenario, the control unit 102-*a* may be in communication with a location tracking device of the occupant's mobile device 108 and the control unit 102-*a* may receive communications from the mobile device 108 indicating that the mobile device 108 is away from the building. The control unit 102-*a* may make the assumption, based on the communications from the mobile device 108, that the occupant is also away from the building. However, if an on-site occupancy sensor indicates that the building is occupied, the control unit 102-*a* may send a question to the occupant asking whether he or she is currently at the building. Another appropriate type of question may be a question asking the occupant if there is another occupant living in the home. Yet another appropriate question may involve asking if another person uses the occupant's mobile device. In some situations, the control unit 102-*a* may ask the occupant if there is another person living in the building.

Figure 2:
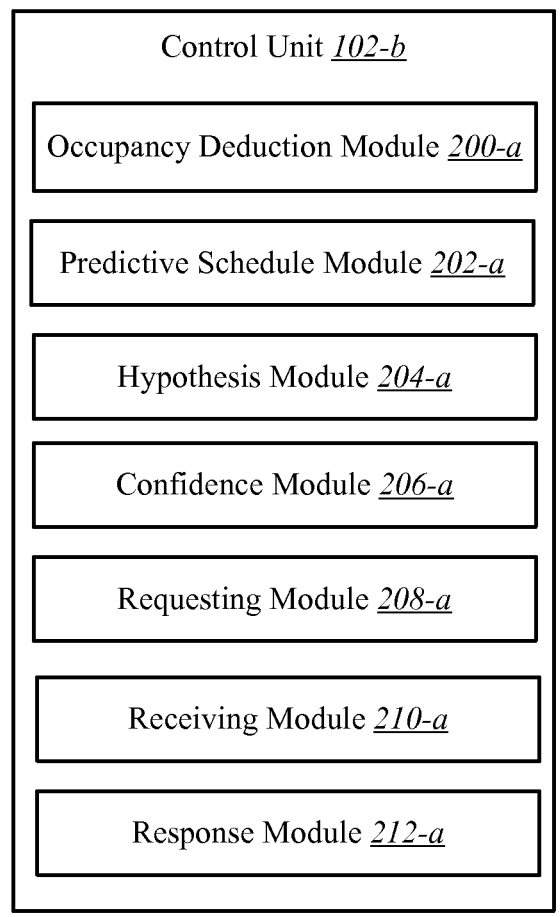
FIG. 2 is a block diagram of an example of a control unit of the environment shown in FIG. 1.

FIG. 2 is a block diagram illustrating one example of a control unit 102-*b*. In this example, the control unit 102-*b* has an occupancy deduction module 200-*a*, a predictive schedule module 202-*a*, a hypothesis module 204-*a*, a confidence module 206-*a*, a requesting module 208-*a*, a receiving module 210-*a*, and a response module 212-*a*.

The occupancy deduction module 200-*a* may be used to deduce whether a building is occupied or not. For example, if the occupancy sensor 104 detects the presence of a person, the occupancy deduction module 200-*a* may deduce that the building is currently in an occupied state. On the other hand, if the occupancy sensor 104 does not detect the presence of an occupant, the occupancy deduction module 200-*a* may deduce that the building is in an unoccupied state. However, in either state, the occupancy deduction module 200-*a* may have varying degrees of confidence about the deduced state.

The predictive schedule module 202-*a* may generate and/or maintain a schedule that predicts when the building will be occupied or unoccupied. Such a predictive schedule may be based on the historical occupancy patterns recorded over time with the occupancy sensors 104. The predictive schedule may include schedules that are unique for each day of the week, month, year, other time periods, or combinations thereof. The predictive schedule can be stored remotely or locally at the control unit 102-*b*. Further, the predictive schedule module 202-*a* can modify the predictive schedule over time as more occupancy data is gathered. In some examples, the predictive schedule module 202-*a* initially begins with a default schedule. In other examples, the predictive schedule module 202-*a* builds the predictive schedule from scratch based on the determined occupancy patterns.

In some examples, the predictive schedule has just an occupied state and an unoccupied state. In other examples, the predictive schedule includes additional occupancy states that give more detail about the occupant's behavior, such as an "on the way to work" state, an "at work" state, a "heading home from work" state, another type of state, or combinations thereof. The additional occupancy states may help the control module understand when the building is likely to be reoccupied.

The hypothesis module 204-*a* may construct any appropriate hypothesis about whether the building is occupied or a hypothesis about a detail that would help the predictive schedule module 202-*a* determine if the building is occupied or not. For example, if an occupancy sensor 104 detects music, but there is no other indication that an occupant is in the building, the hypothesis module 204-*a* may construct a hypothesis that the occupant left a radio playing before leaving the home. In another example, the hypothesis module 204-*a* may construct a hypothesis that the occupant is away from the building based on communications from the mobile device despite movements detected from the occupancy sensor 104 that may be attributable to curtains blowing in the breeze from an open window.

The hypothesis module 204-*a* may make a hypothesis about data that is desirable for constructing the predictive schedule, but such desirable data is missing. In other examples, the hypothesis module 204-*a* may make a hypothesis about information that appears to be unreliable or inconsistent with other information.

While the above examples have been described with reference to specific types of hypothesis that the hypothesis module 204-*a* can make, the hypothesis module 204-*a* may make any appropriate type of hypothesis about any detail relevant to making or modifying the predictive schedule. Further, while the above examples have been described with reference to specific types of information on which the hypothesis module 204-*a* may base the hypothesis, the hypothesis module 204-*a* may use any appropriate type of information to make a hypothesis.

The confidence module 206-*a* determines a confidence that the predictive schedule contains an accurate deduced state or that the details upon which the predictive schedule module 202-*a* relies are accurate. If the confidence module 206-*a* assigns a low confidence to a particular piece of information, such information may not be relied upon while constructing the predictive schedule. As a result, portions of the predictive schedule may include gaps where the predictive schedule fails to predict occupancy in the building. On the other hand, the predictive schedule module 202-*a* may rely on those pieces of information that are assigned a high enough confidence.

The requesting module 208-*a* generates a request for an occupant for information that is calculated to help find missing information, increase a confidence in obtained information, or otherwise ascertain information relevant to the constructing or modifying the predictive schedule. For example, the request may include a question that is intended to confirm whether the hypothesis made by the hypothesis module 204-*a* is accurate. In another example, the request may seek information that is calculated to verify the accuracy of data received from the occupancy sensors 104.

In some examples, the requesting module 208-*a* sends a request to the mobile device 108. The occupant may respond to the request through a user interface incorporated into the mobile device 108. In other examples, the request is emailed to the user or displayed in a display incorporated into the control unit 102-*a*. While the examples above have been described with reference to specific mechanisms that the requesting module 208-*a* can use to deliver a request for information to the occupant, the requesting module 208-*a* may use any appropriate mechanism to send the request to the occupant.

Further, the requesting module 208-*a* may send the request in any appropriate format. For example, the request may include predetermined answers that the user can select to reply. For example, the predetermined answers may be "yes" or "no" where the user can select the appropriate answer to reply. In other examples, a set of predetermined answers may include different types of information. In such an example, a predetermined answer may state "I typically get home around 5 pm." If that predetermined answer is accurate, the occupant can select that predetermined answer. In other examples, the request may include a free text format, where the user can type in the answer to the request.

The receiving module 210-*a* receives the answers from the occupant. Any appropriate mechanism for receiving the answers may be used. For example, the receiving module 210-*a* may include a wireless or a hardwired connection with the device to which the request was sent.

The response module 212-*a* responses to the received information. First, the response module 212-*a* determines the meaning of the information in the response. In those examples where a predetermined answer was provided and selected, the response module 212-*a* determines which of the answers was selected. In other examples, the response module 212-*a* may perform a key word analysis in a free text formatted answer. However, any appropriate mechanism may be implemented to determine the meaning of the information in the answer.

Next, the response module 212-*a* responses to the meaning of the information in the answer. In those situations where the received information confirms the hypothesis generated by the hypothesis module 204-*a*, the response module 212-*a* may send a communication to the predictive schedule module 202-*a* indicating either the hypothesis can be treated as fact or confirming to the predictive schedule module 202-*a* that the hypothesis is accurate. In other examples, changes to the predictive schedule may result based on the information received from the occupant. In some examples, the response module 212-*a* may determine that no action is appropriate.

Figure 3:
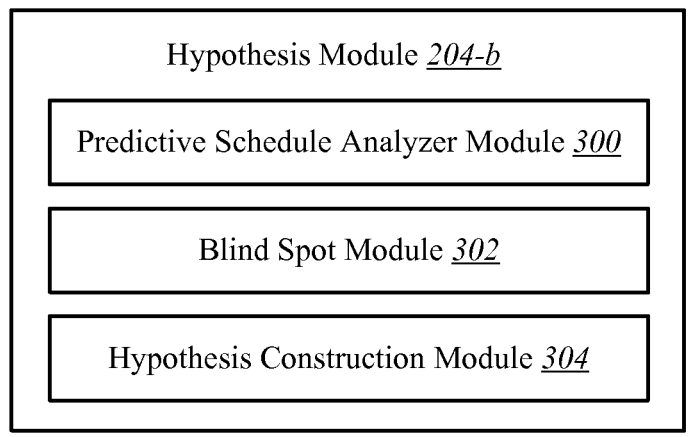
FIG. 3 is a block diagram of an example of an hypothesis module of the control unit of FIG. 2.

FIG. 3 is a block diagram illustrating an example of a hypothesis module 204-*b*. In this example, the hypothesis module 204-*b* has a predictive schedule analyzer module 300, a blind spot module 302, and a hypothesis construction module 304.

The predictive schedule analyzer module 300 analyzes the predictive schedule or the information to be relied upon to construct the predictive schedule. Such an analysis may look at the information that is relied upon to construct the predictive schedule. For example, the analysis may determine the readings from the occupancy sensors and make a determination as to whether that information is reliable for being used in the predictive schedule. In some examples, such information indicates that the building is occupied, but such indicators are not reliable and therefore a low confidence is associated with such information.

The blind spot module 302 identifies if the occupancy sensors 104 are capable of detecting an adequate amount of information to make the predictive schedule. For example, the blind spot module 302 may analyze information to determine whether occupancy sensors 104 are appropriately positioned throughout the building. Such an analysis may cause the blind spot module 302 to consider whether additional occupancy sensors are desirable for detecting occupancy. For example, if there is no occupancy sensor 104 positioned in a room of a home and no other occupancy sensors in the building would be able to detect the presence of an individual in that home, than the room may be part of a blind spot to the occupancy detection system. An analysis of the occupancy sensors may reveal that the sensors' ability to detect the occupant's presence disappears from time to time. Such a failure to detect the occupant's presence may occur when the occupant enters the blind spot. Based on the analysis, the blind spot module 302 may identify patterns indicative of a blind spot.

The hypothesis construction module 304 constructs the hypothesis. The hypothesis can be based on the analysis of the blind spot module 302, the predictive schedule analyzer module 300, another module, or combinations thereof. An example of a hypothesis may include identifying a location where a blind spot exists. Another example of a hypothesis may involve determining that the building is occupied based on data that suggests the building could be occupied, but is not conclusive. Another example of a hypothesis could be predicting the time that the building will transition from one occupancy state to another.

Figure 4:
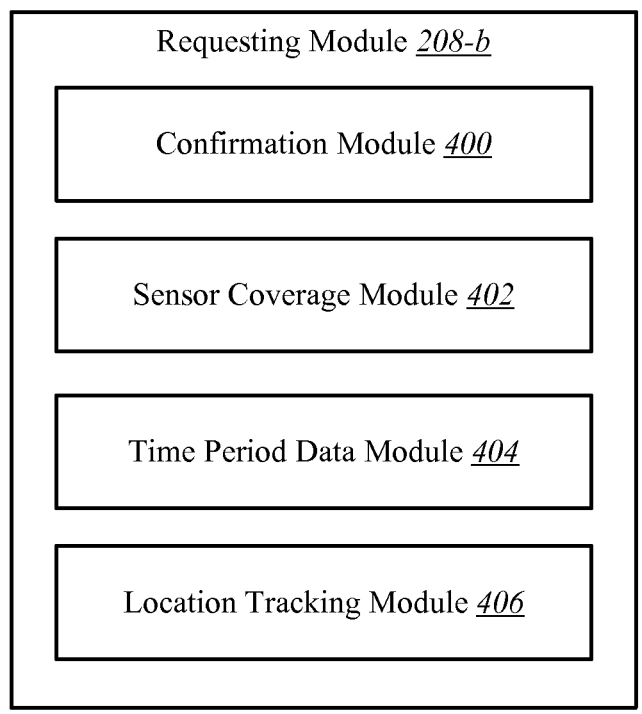
FIG. 4 is a block diagram of an example of a requesting module of the control unit of FIG. 2.

FIG. 4 is a block diagram illustrating one example of a requesting module 208-*b*. In this example, the requesting module 208-*b* includes a confirmation module 400, a sensor coverage module 402, a time period data module 404, and a location tracking module 406.

The confirmation module 400 may cause a request to be made that seeks to confirm whether a hypothesis generated by the hypothesis module 204 is accurate. In one example, the confirmation module 400 may formulate a question that restates the hypothesis in a question format. In such an example, a request may include "yes" or "no" predetermined answers that can be selected by the recipient of the request.

The sensor coverage module 402 may format requests for information about the location of the occupancy sensors. For example, the request may include asking whether an occupancy sensor is located in a particular room. In another example, the request may involve asking if the occupant is located within a specific room when the occupant has disappeared from the occupancy sensors. In yet another example, a request may ask where the occupant was at a specific time. Such questions may be aimed at determining the adequacy of the occupancy sensors coverage.

The time period data module 404 may make requests for information about time periods where no reliable data for determining occupancy exists. For example, if a time period exists where no occupancy is detected, but no door type event has occurred that could indicate that an occupant left the building, then the request could be directed to finding out the location of where the occupant was during that time. In another example, the request could be directed at determining the location of the occupant when the occupancy sensors and other types of indicators are sending conflicting details about occupancy.

The location tracking module 406 may include requests that deal with determining how many mobile devices are available to determine occupancy. For example, a request may involve asking how many occupants use a mobile device that have location tracking mechanisms that the control unit 102 can use to determine occupancy. Another type of request may include asking how often the occupant is with his or her mobile device to determine how reliable the mobile device's location can be associated with the occupant's location. For example, if the mobile device is often left behind when the occupant leaves his or her home, the control unit 102 can associate a lower confidence with data indicating the occupant's location based on the mobile device's location tracking mechanism.

Figure 5:
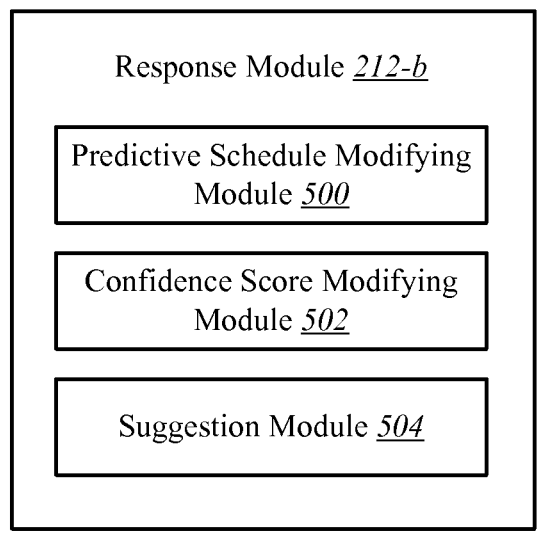
FIG. 5 is a block diagram of an example of a response module of the control unit of FIG. 2.

FIG. 5 is a block diagram illustrating one example of a response module 212-*b*. In this example, the response module 212-*b* includes a predictive schedule modifying module 500, a confidence score modifying module 502, and a suggestion module 504.

The predictive schedule modifying module 500 may cause the predictive schedule to be modified based on the information provided by the user. For example, if the user indicates that the mobile device's location tracking mechanism is not reliable because the occupant often lets a neighbor borrow his or her mobile device, and the predictive schedule was based on communications from the mobile device, the predictive schedule modifying module 500 may undo those portions of the predictive schedule that were based on the mobile device's communications.

The confidence score modifying module 502 may modify the confidence scores of the information used to construct a portion of the predictive module. For example, if the predictive schedule was based in part on data that had a lower confidence score than desired, and an answer from the occupant indicates that information is correct, the confidence score modifying module 502 may increase the confidence score. Similarly, if the occupant indicates that such information is not correct, then the confidence score modifying module 502 may decrease the information's confidence score.

The suggestion module 504 can make suggestions to the occupant based on the user's response. For example, if the answer from the occupant indicates that there is likely a blind spot in the occupancy detection system, then the suggestion module 504 can send a message to the occupant suggesting that another occupancy sensor be installed to cover the blind spot.

Figure 6:
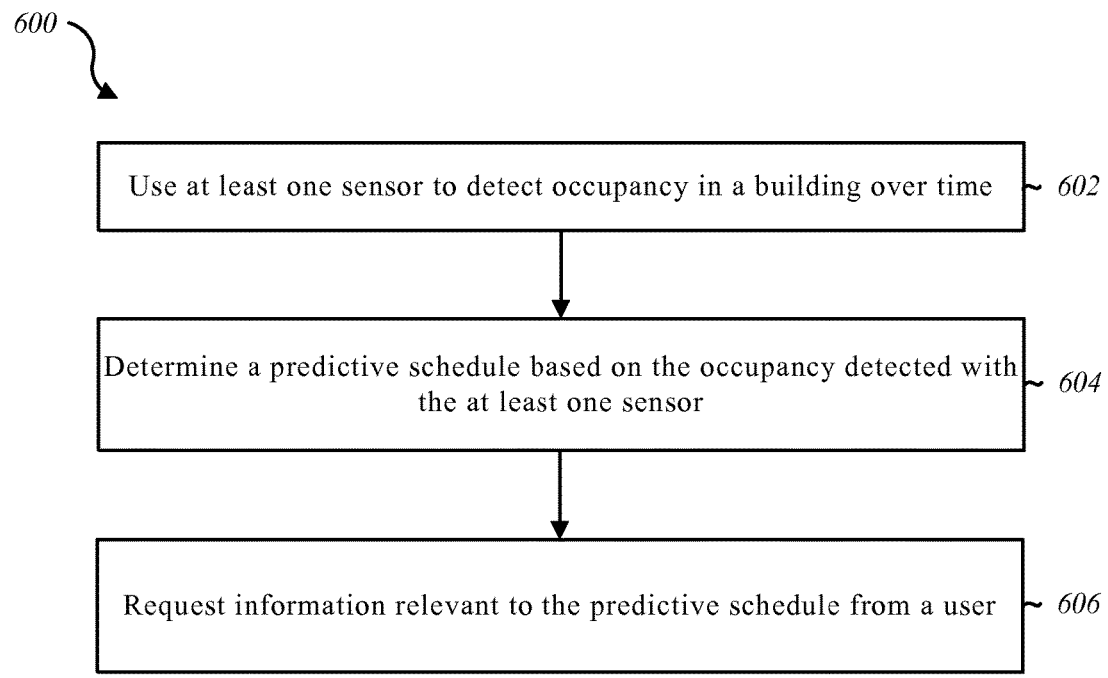
FIG. 6 is a flow diagram illustrating an example of a method for determining occupancy with user provided information.

FIG. 6 is a flow diagram illustrating one embodiment of a method 600 for determining occupancy with user provided information. In this example, the method 600 includes using 602 at least one sensor to detect occupancy in a building over time, determining 604 a predictive schedule based on the occupancy detected with the at least one sensor, and requesting 606 information relevant to the predictive schedule from a user. Such a method 600 may be implemented with a control unit 102 shown in FIGS. 1 and/or 2. In other examples, method 600 may be performed generally by the environment 100 shown in FIG. 1.

At block 602, occupancy sensors are used to determine whether the building is occupied or unoccupied. An occupancy sensor may be any appropriate type of sensor that is capable of determining whether an occupant is present within the building. For example, a motion detector, video camera, microphone, thermometer, door sensor, window sensor, another type of sensor, or combinations thereof may be used to detect the presence of an occupant.

At block 604, the predictive schedule is determined based on the occupancy patterns detected in the building over time. Such a schedule predicts when the building will be occupied and/or unoccupied.

At block 606, a request is sent to the user for information that is relevant to the predictive schedule. Such user provided information may be used to change the predictive schedule, confirm hypothesis relevant to the predictive schedule, make a suggestion to the user, change a confidence score associated with information for making the predictive schedule, perform another action, or combinations thereof.

Figure 7:
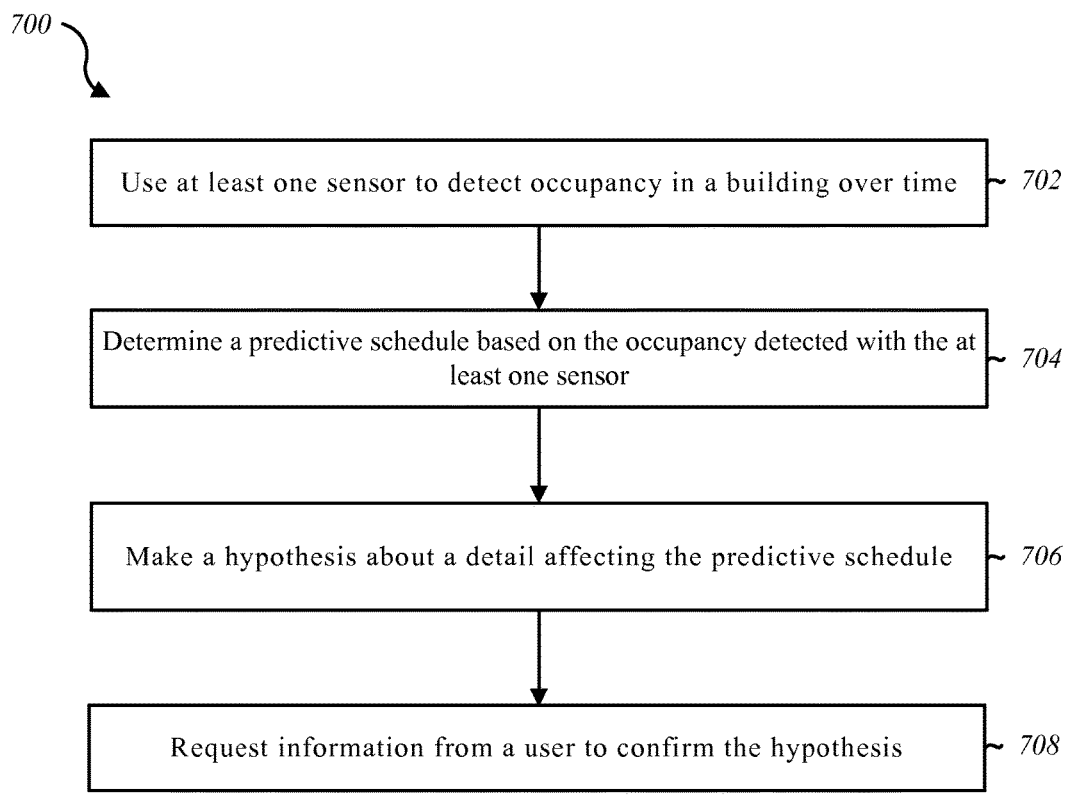
FIG. 7 is a flow diagram illustrating an example of a method for determining occupancy with user provided information.

FIG. 7 is a flow diagram illustrating one embodiment of a method 700 for determining occupancy with user provided information. In this example, the method 700 includes using 702 at least one sensor to detect occupancy in a building over time, determining 704 a predictive schedule based on the occupancy detected with the at least one sensor, making 706 a hypothesis about a detail affecting the predictive schedule, and requesting 708 information from a user to confirm the hypothesis. Such a method 700 may be implemented with a control unit 102 shown in FIGS. 1 and/or 2. In other examples, method 700 may be performed generally by the environment 100 shown in FIG. 1.

At block 706, a hypothesis is formed that can serve as the basis of a question to be asked of the user. Such a hypothesis may be based on desirable, but missing, information for making the predictive schedule, based on confidence scores relating to the accuracy of information for making the predictive schedule, based on occupancy sensor data that is indicative of a gap in occupancy sensor coverage, based on communications from a mobile device, based on user input, based on historical occupancy patterns, based on other types of information, or combinations thereof.

At block 708, information is requested of the user to confirm that the hypothesis is true. In those situations where the predictive schedule is already based on an assumption that the hypothesis is true, no change to the predictive schedule is likely to occur. However, if the hypothesis does not appear to be true based on the user's response, the predictive schedule may be changed accordingly. In other cases, the predictive schedule does not assume that the hypothesis is true before requesting a confirmation of the hypothesis from the user. In those cases where the user indicates that the hypothesis is false, no change to the predictive schedule is likely. However, in those situations where the hypothesis is confirmed by the user, the predictive schedule may be changed accordingly.

Figure 8:
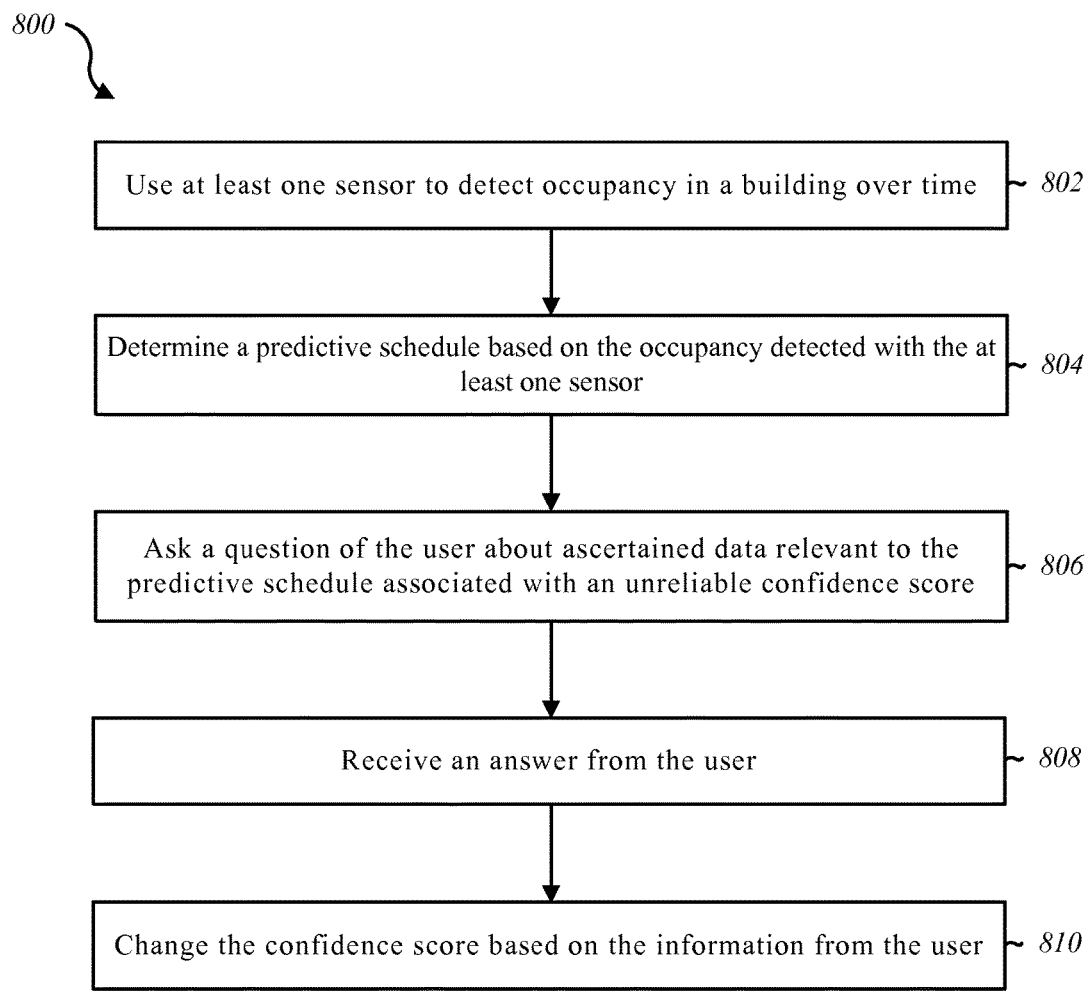
FIG. 8 is a flow diagram illustrating an example of a method for determining occupancy with user provided information.

FIG. 8 is a flow diagram illustrating one embodiment of a method 800 for determining occupancy with user provided information. In this example, the method 800 includes using 802 at least one sensor to detect occupancy in a building over time, determining 804 a predictive schedule based on the occupancy detected with the at least one sensor, asking 806 a question of the user about ascertained data relevant to the predictive schedule associated with an unreliable confidence score, receiving 808 an answer from the user, and changing 810 the confidence score based on the information from the user. Such a method 800 may be implemented with a control unit 102 shown in FIGS. 1 and/or 2. In other examples, method 800 may be performed generally by the environment 100 shown in FIG. 1.

At block 806, a question is asked of the user about data that has been ascertained by the occupancy detection system. However, the ascertained data has a low confidence score. Data with low confidence scores may be deemed too unreliable to be used to create the predictive schedule. In other examples, data with low confidence scores may be used to create the predictive schedule, although the system has a preference to use data with higher confidence scores. Such a question is sent to the user in any appropriate manner, such as sending the question to the user's mobile device.

At block 808, an answer from the user is received, and at block 810 the confidence score of the relevant information is changed based on the user's response. For example, if the user confirms the accuracy of the data, the confidence score associated with that data may increase. Similarly, if the user denies the accuracy of the data, the confidence score may accordingly decrease.

Figure 9:
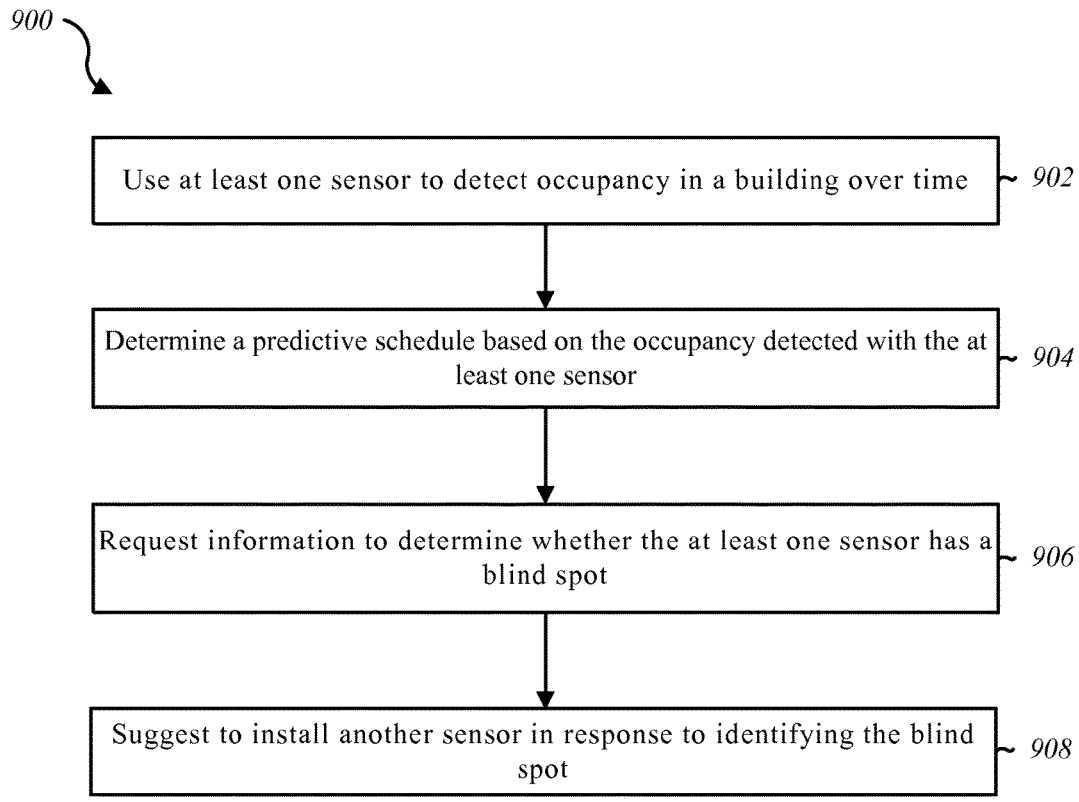
FIG. 9 is a flow diagram illustrating an example of a method for determining occupancy with user provided information.

FIG. 9 is a flow diagram illustrating one embodiment of a method 900 for determining occupancy with user provided information. In this example, the method 900 includes using 902 at least one sensor to detect occupancy in a building over time, determining 904 a predictive schedule based on the occupancy detected with the at least one sensor, requesting 906 information to determine whether the at least one sensor has a blind spot, and suggesting 908 to install another sensor in response to identifying the blind spot. Such a method 900 may be implemented with a control unit 102 shown in FIGS. 1 and/or 2. In other examples, method 900 may be performed generally by the environment 100 shown in FIG. 1.

At block 906, information is requested of the user to determine whether the sensors used to determine occupancy have a blind spot. A blind spot is an area where the occupancy sensors cannot detect the presence of an occupant although the occupant is present within that area. Such blind spots may occur when the occupant is out of range of the occupancy sensors.

At block 908, a suggestion is made to install another sensor in response to identifying a blind spot. For example, if a blind spot is identified in a particular room within the building, the recommendation may be to install an occupancy sensor in that room. Likewise, if just a portion of a specific room is part of a blind spot, the suggestion may include recommending a second occupancy sensor in that room that will cover the area blind to the occupancy sensors. Other suggestions may include recommending that a particular type of occupancy sensor be replaced within another occupancy sensor type, that a specific occupancy sensor be replaced, that a certain occupancy sensor be programmed to operate differently, another type of suggestion, or combinations thereof.

Figure 10:
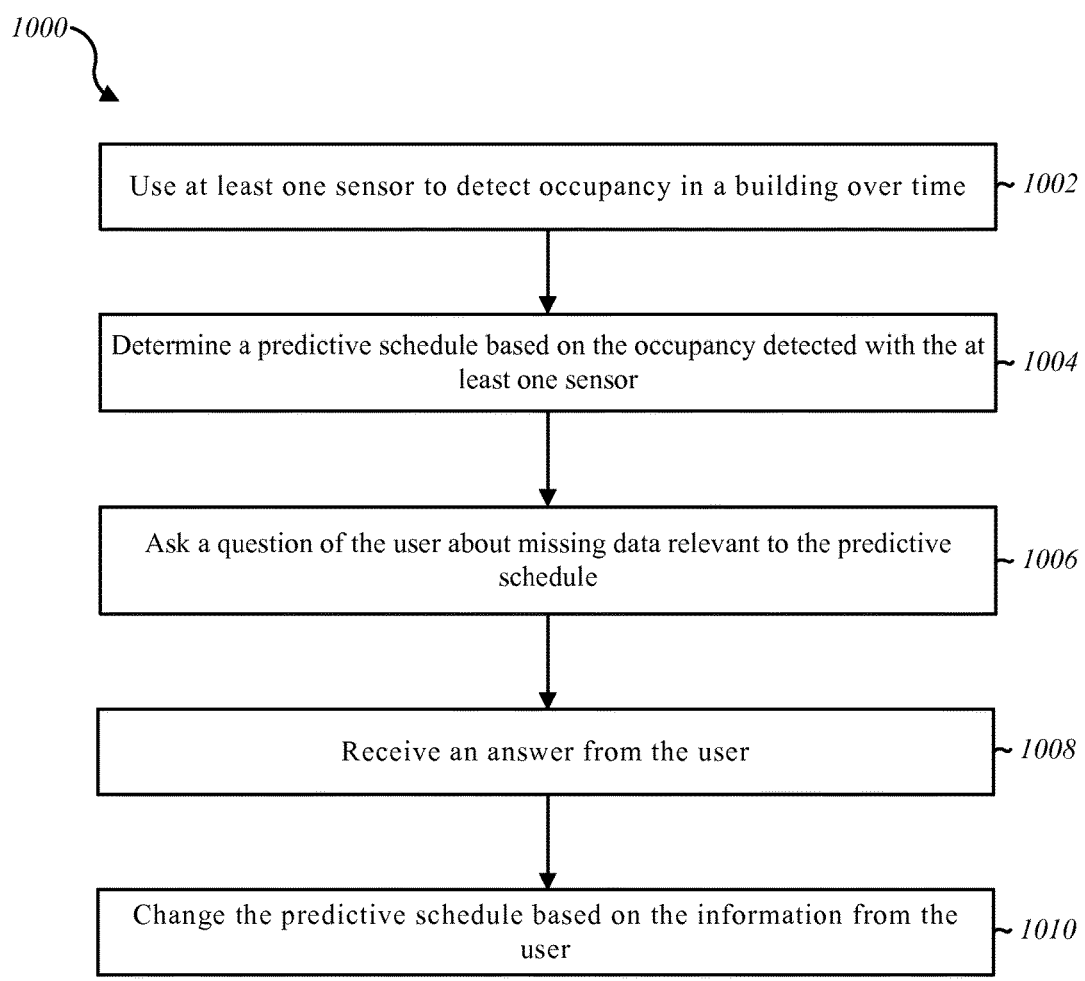
FIG. 10 is a flow diagram illustrating an example of a method for determining occupancy with user provided information.

FIG. 10 is a flow diagram illustrating one embodiment of a method 1000 for determining occupancy with user provided information. In this example, the method 1000 includes using 1002 at least one sensor to detect occupancy in a building over time, determining 1004 a predictive schedule based on the occupancy detected with the at least one sensor, asking 1006 a question of the user about missing data relevant to the predictive schedule, receiving 1008 an answer from the user, and changing 1010 the predictive schedule based on the information from the user. Such a method 1000 may be implemented with a control unit 102 shown in FIGS. 1 and/or 2. In other examples, method 1000 may be performed generally by the environment 100 shown in FIG. 1.

At block 1006, a question is asked of the user about data that is missing and is relevant to the predictive schedule. Such missing data may include data that is desirable to generate the predictive schedule, but was not collected. Such data may not be sent to the appropriate module for creating or modifying the predictive schedule due to inconsistent data or other factors rendering the data less reliable than desired. In other examples, no data relevant to a portion of the predictive schedule was ever collected.

At block 1008, an answer to the question is received. Such an answer may be a selected predetermined answer, a free text formatted answer, another type of answer, or combinations thereof. The answer may be sent over a mobile device, a speech command, a button input, another mechanism, or combinations thereof.

At block 1010, a change is made to the predictive schedule based on the information from the user. For example, if the answer to the question indicates that some information previously believed to be unreliable is accurate data, the predictive schedule may be changed to rely on such information. In such an example, if occupancy data during a specific time period on week days appeared to be unreliable, a question asking if the user is often home during that period may be sent to the user. In response, the user may indicate in a reply that the user is often home during that period. In response to determining that the user is home during that time period, the predictive schedule may be changed from an unknown predictive state to an occupied predicted state.

Figure 11:
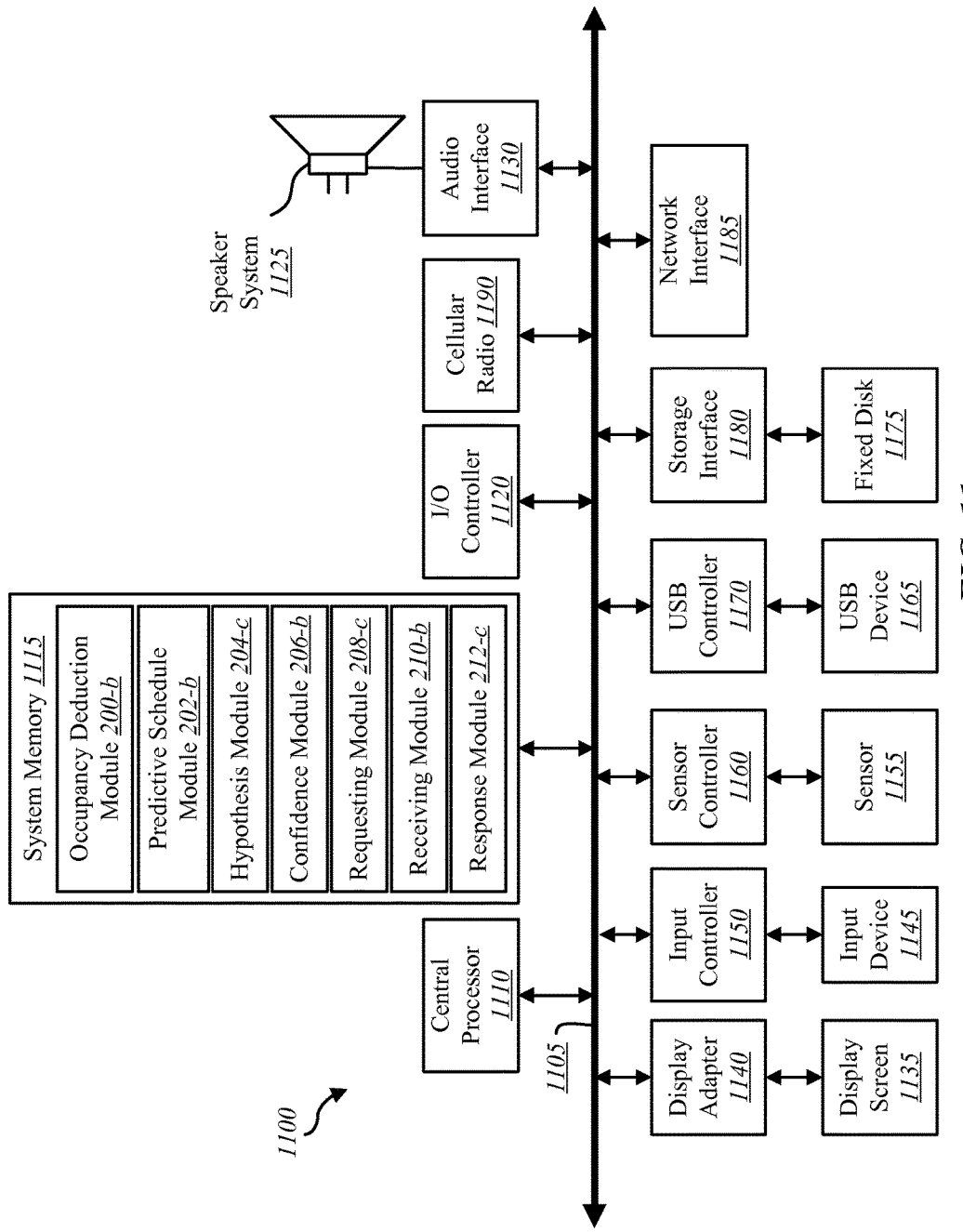
FIG. 11 is a block diagram of a computer system suitable for implementing the present systems and methods of FIG. 1.

FIG. 11 depicts a block diagram of a controller 1100 suitable for implementing the present systems and methods. The controller 1100 may be an example of the control unit 102-a in FIG. 1. In one configuration, controller 1100 includes a bus 1105 which interconnects major subsystems of controller 1100, such as a central processor 1110, a system memory 1115 (typically RAM, but which may also include ROM, flash RAM, or the like), an input/output controller 1120, an external audio device, such as a speaker system 1125 via an audio output interface 1130, an external device, such as a display screen 1135 via display adapter 1140, an input device 1145 (e.g., remote control device interfaced with an input controller 1150), multiple USB devices 1165 (interfaced with a USB controller 1170), one or more cellular radios 1190, and a storage interface 1180. Also included are at least one sensor 1155 connected to bus 1105 through a sensor controller 1160 and a network interface 1185 (coupled directly to bus 1105).

Bus 1105 allows data communication between central processor 1110 and system memory 1115, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, an occupancy deduction module 200-b, a predictive schedule module 202-b, a hypothesis module 204-c, a confidence module 206-b, a requesting module 208-c, a receiving module 210-b, and a response module 212-c may be used to implement the present systems and methods may be stored within the system memory 1115. These modules may be an example of the modules illustrated in FIG. 2. Applications resident with controller 1100 are generally stored on and accessed via a non-transitory computer readable medium, such as a hard disk drive (e.g., fixed disk 1175) or other storage medium. Additionally, applications can be in the form of electronic signals modulated in accordance with the application and data communication technology when accessed via network interface 1185.

Storage interface 1180, as with the other storage interfaces of controller 1100, can connect to a standard computer readable medium for storage and/or retrieval of information, such as a fixed disk drive 1175. Fixed disk drive 1175 may be a part of controller 1100 or may be separate and accessed through other interface systems. Network interface 1185 may provide a direct connection to a remote server via a direct network link to the Internet via a POP (point of presence). Network interface 1185 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to controller 1100 wirelessly via network interface 1185. In one configuration, the cellular radio 1190 may include a receiver and transmitter to wirelessly receive and transmit communications via, for example, a cellular network.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 11 need not be present to practice the present systems and methods. The devices and subsystems can be interconnected in different ways from that shown in FIG. 11. The aspect of some operations of a system such as that shown in FIG. 11 are readily known in the art and are not discussed in detail in this application. Code to implement the present disclosure can be stored in a non-transitory computer-readable medium such as one or more of system memory 1115 or fixed disk 1175. The operating system provided on controller 1100 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A computer implemented method for determining occupancy with user provided information, comprising:

using at least one sensor to detect occupancy in a building over time;

determining, by a processor, a predictive schedule based on the occupancy detected with the at least one sensor;

determining, by the processor, that information relevant to the predictive schedule is missing from the occupancy detected with the at least one sensor;

determining, by the processor, whether a confidence score associated with the predictive schedule satisfies a threshold, wherein the confidence score associated with the predictive schedule is based at least in part on the missing information relevant to the predictive schedule;

transmitting, by the processor, a request for the missing information relevant to the predictive schedule to a user to determine whether the at least one sensor has a blind spot, wherein requesting the information is based at least in part on determining that the confidence score associated with the predictive schedule satisfies the threshold;

receiving, by the processor, information from the user;

verifying, by the processor, that the information received from the user is associated with the missing information relevant to the predictive schedule;

identifying, by the processor, a location in the building where the at least one sensor has the blind spot based at least in part on the information received from the user and the occupancy detected with the at least one sensor;

changing, by the processor, the confidence score about ascertained data relevant to the predictive schedule based at least in part on the identified location;

updating, by the processor, the predictive schedule based at least in part on changing the confidence score; and automatically performing a task associated with the building, by the processor, based at least in part on updating the predictive schedule, wherein performing the task may be at least one of activating an alarm at the building, adjusting a climate control setting, opening a door, closing a door, locking a door, unlocking a door, controlling a security parameters, managing settings associated with energy consumption; control lighting associated with the building, control cameras associated with the building, send a notification regarding an event associated with the building, or a combination thereof.

2. The method of claim 1, wherein transmitting the request for the information relevant to the predictive schedule to the user comprises sending a question to a device associated with the user.

3. The method of claim 1, wherein transmitting the request for the information relevant to the predictive schedule to the user comprises asking a question of the user about missing data relevant to the predictive schedule.

4. The method of claim 1, wherein transmitting the request for the information relevant to the predictive schedule to the user comprises asking a question of the user about ascertained data relevant to the predictive schedule associated with an unreliable confidence score.

5. The method of claim 1, further comprising changing the predictive schedule based on the information from the user.

6. The method of claim 1, wherein transmitting the request for the information relevant to the predictive schedule to the user comprises requesting data about a period of time where no occupancy is detected.

7. The method of claim 1, wherein transmitting the request for the information relevant to the predictive schedule to the user comprises requesting the information about a number of occupants with location tracking mobile devices.

8. The method of claim 1, further comprising suggesting to install another sensor at the location in response to identifying the blind spot.

9. The method of claim 1, further comprising making a hypothesis about a detail relevant to the predictive schedule.

10. The method of claim 9, wherein transmitting the request for the information relevant to the predictive schedule to the user comprises requesting the user to confirm an accuracy of the hypothesis.

11. A computing device configured for determining occupancy with user provided information, comprising:
a processor;
memory in electronic communication with the processor; and
instructions stored in the memory, the instructions being executable by the processor to:
use at least one sensor to detect occupancy in a building over time;
determine a predictive schedule based on the occupancy detected with the at least one sensor;
determine that information relevant to the predictive schedule is missing from the occupancy detected with the at least one sensor;
determine whether a confidence score associated with the predictive schedule satisfies a threshold, wherein the confidence score associated with the predictive schedule is based at least in part on the missing information relevant to the predictive schedule;
transmit a request for the missing information relevant to the predictive schedule to a user to determine whether the at least one sensor has a blind spot, wherein requesting the information is based at least in part on determining that the confidence score associated with the predictive schedule satisfies the threshold;
receive information from the user;
verify that the information received from the user is associated with the missing information relevant to the predictive schedule;
identify a location in the building where the at least one sensor has the blind spot based at least in part on the information received from the user and the occupancy detected with the at least one sensor; and
change the confidence score about ascertained data relevant to the predictive schedule based at least in part on the identified location;
update the predictive schedule based at least in part on changing the confidence score; and
automatically perform a task associated with the building based at least in part on updating the predictive schedule, wherein performing the task may be at least one of activating an alarm at the building, adjusting a climate control setting, opening a door, closing a door, locking a door, unlocking a door, controlling a security parameters, managing settings associated with energy consumption; control lighting associated with the building, control cameras associated with the building, send a notification regarding an event associated with the building, or a combination thereof.

12. The computing device of claim 11, wherein the instructions are further executable by the processor to ask a question of the user about missing data relevant to the predictive schedule.

13. The computing device of claim 11, wherein the instructions are further executable by the processor to request data about a period of time where no occupancy is detected.

14. The computing device of claim 11, wherein the instructions are further executable by the processor to ask a question of the user about ascertained data relevant to the predictive schedule associated with an unreliable confidence score.

15. The computing device of claim 11, wherein the instructions are further executable by the processor to request the information about a number of occupants with location tracking mobile devices.

16. The computing device of claim 11, wherein the instructions are further executable by the processor to request data relevant to the predictive schedule from the user to confirm an accuracy of a hypothesis about a detail affecting the predictive schedule.

17. A computer-program product for determining occupancy with user provided information, the computer-program product comprising a non-transitory computer-readable medium having instructions thereon, the instructions being executable by a processor to:
use at least one sensor to detect occupancy in a building over time;
determine a predictive schedule based on the occupancy detected with the at least one sensor;
determine that information relevant to the predictive schedule is missing from the occupancy detected with the at least one sensor;
make a hypothesis about a detail affecting the predictive schedule;
determine whether a confidence score associated with the hypothesis satisfies a threshold, wherein the confidence score associated with the predictive schedule is based at least in part on the missing information relevant to the predictive schedule;
transmit a request for the missing information to a user to confirm the hypothesis to determine whether the at least one sensor has a blind spot, wherein requesting the information is based at least in part on determining that the confidence score associated with the hypothesis satisfies the threshold;
receive information from the user;

verify that the information received from the user is associated with the missing information relevant to the predictive schedule;

identify a location in the building where the at least one sensor has the blind spot based at least in part on the information received from the user and the occupancy detected with the at least one sensor; and change the confidence score about ascertained data relevant to the predictive schedule based at least in part on the identified location;

update the predictive schedule based at least in part on changing the confidence score; and automatically perform a task associated with the building based at least in part on updating the predictive schedule, wherein performing the task may be at least one of activating an alarm at the building, adjusting a climate control setting, opening a door, closing a door, locking a door, unlocking a door, controlling a security parameters, managing settings associated with energy consumption; control lighting associated with the building, control cameras associated with the building, send a notification regarding an event associated with the building, or a combination thereof.

* * * * *